United States Patent
Fujii et al.

(10) Patent No.: US 7,826,541 B2
(45) Date of Patent: Nov. 2, 2010

(54) WIRELESS RELAY SYSTEM, WIRELESS RELAY APPARATUS, AND WIRELESS RELAY METHOD

(75) Inventors: Hiromasa Fujii, Yokosuka (JP); Hirohito Suda, Yokosuka (JP); Tetsu Tanaka, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 1002 days.

(21) Appl. No.: 11/061,539

(22) Filed: Feb. 18, 2005

(65) Prior Publication Data
US 2005/0190822 A1   Sep. 1, 2005

(30) Foreign Application Priority Data
Feb. 19, 2004  (JP)  .............. 2004-042789

(51) Int. Cl.
*H04K 1/10*   (2006.01)
*H03K 11/00*  (2006.01)
*H04L 5/14*   (2006.01)

(52) U.S. Cl. .............. 375/260; 375/214; 370/294

(58) Field of Classification Search .............. 375/211, 375/219, 296, 316, 347–348, 2.08, 214, 260; 370/491–492, 500–501, 294; 379/4, 15.01, 379/338, 343, 406.01, 406.12–406.13; 455/7, 455/73, 91
See application file for complete search history.

(56) References Cited

U.S. PATENT DOCUMENTS

| | | | | |
|---|---|---|---|---|
| 5,115,514 A | * | 5/1992 | Leslie | 455/9 |
| 5,809,083 A | * | 9/1998 | Wright | 375/285 |
| 5,898,679 A | * | 4/1999 | Brederveld et al. | 370/315 |
| 6,061,548 A | * | 5/2000 | Reudink | 455/18 |
| 6,172,993 B1 | * | 1/2001 | Kim et al. | 370/516 |
| 6,369,758 B1 | * | 4/2002 | Zhang | 342/383 |

(Continued)

FOREIGN PATENT DOCUMENTS

EP   0 851 606 A2   7/1998

(Continued)

OTHER PUBLICATIONS

"Capacity of Ergodic MIMO Channels with Complete Transmitter Channel Knowledge" Grant, A.; Communications Theory Workshop, 2005. Proceedings. 6th Australian Feb. 2-4, 2005 pp. 125-129.*

(Continued)

*Primary Examiner*—Mohammad H Ghayour
*Assistant Examiner*—Sarah Hassan
(74) *Attorney, Agent, or Firm*—Oblon, Spivak, McClelland, Maier & Neustadt, L.L.P.

(57) ABSTRACT

A wireless relay system for relaying a radio signal transmitted from a first wireless station to a second wireless station via a wireless relay apparatus is disclosed. The wireless relay system includes a relay control part for receiving transmission symbols transmitted from the first wireless station and refraining from relaying a portion of the symbols, a pilot signal transmission part for transmitting a pilot signal that is inserted into a section of the portion of the transmission symbols, a coupling loop interference wave estimation part for receiving the pilot signal and estimating a coupling loop interference wave based on the pilot signal, and a coupling loop interference wave cancellation part for subtracting the estimated coupling loop interference wave from a reception signal.

11 Claims, 15 Drawing Sheets

U.S. PATENT DOCUMENTS

| | | | |
|---|---|---|---|
| 6,377,612 B1 * | 4/2002 | Baker | 375/141 |
| 6,563,881 B1 * | 5/2003 | Sakoda et al. | 375/260 |
| 2002/0039383 A1 * | 4/2002 | Zhu et al. | 375/214 |
| 2002/0051483 A1 * | 5/2002 | Tiedemann et al. | 375/145 |
| 2002/0191630 A1 * | 12/2002 | Jacobsen | 370/430 |
| 2003/0031278 A1 * | 2/2003 | Kang et al. | 375/341 |
| 2003/0124976 A1 * | 7/2003 | Tamaki et al. | 455/15 |
| 2003/0130003 A1 * | 7/2003 | Won | 455/522 |
| 2003/0148765 A1 * | 8/2003 | Ma et al. | 455/438 |
| 2005/0135284 A1 * | 6/2005 | Nanda et al. | 370/294 |

FOREIGN PATENT DOCUMENTS

| | | |
|---|---|---|
| EP | 1 087 559 A1 | 3/2001 |
| JP | 8-331015 | 12/1996 |
| JP | 8-331016 | 12/1996 |
| JP | 2000-244382 | 9/2000 |
| JP | 2001-186073 | 7/2001 |
| JP | 2003-174392 | 6/2003 |
| JP | 2003-298548 | 10/2003 |
| JP | EP 1357713 * | 10/2003 |
| WO | WO 02091657 * | 11/2002 |
| WO | WO 04/001986 A2 | 12/2003 |

OTHER PUBLICATIONS

Imad Barhumi, et al., "Optimal Training Design for MIMO OFDM Systems in Mobile Wireless Channels", IEEE Transactions on Signal Processing, vol. 51, No. 6, Jun. 2003, pp. 1615-1624.

Ying-Chang Liang, et al., "Sub-Channel Grouping and Statistical Water-Filling for MIMO-OFDM Systems", Signals, Systems and Computers, vol. 1, Nov. 2003, pp. 997-1001.

\* cited by examiner

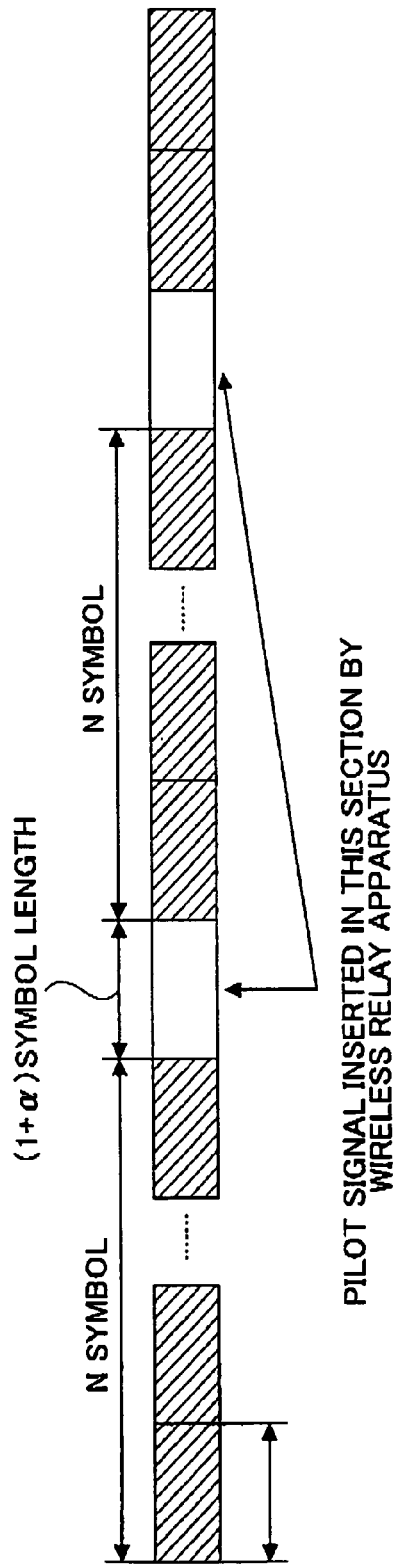

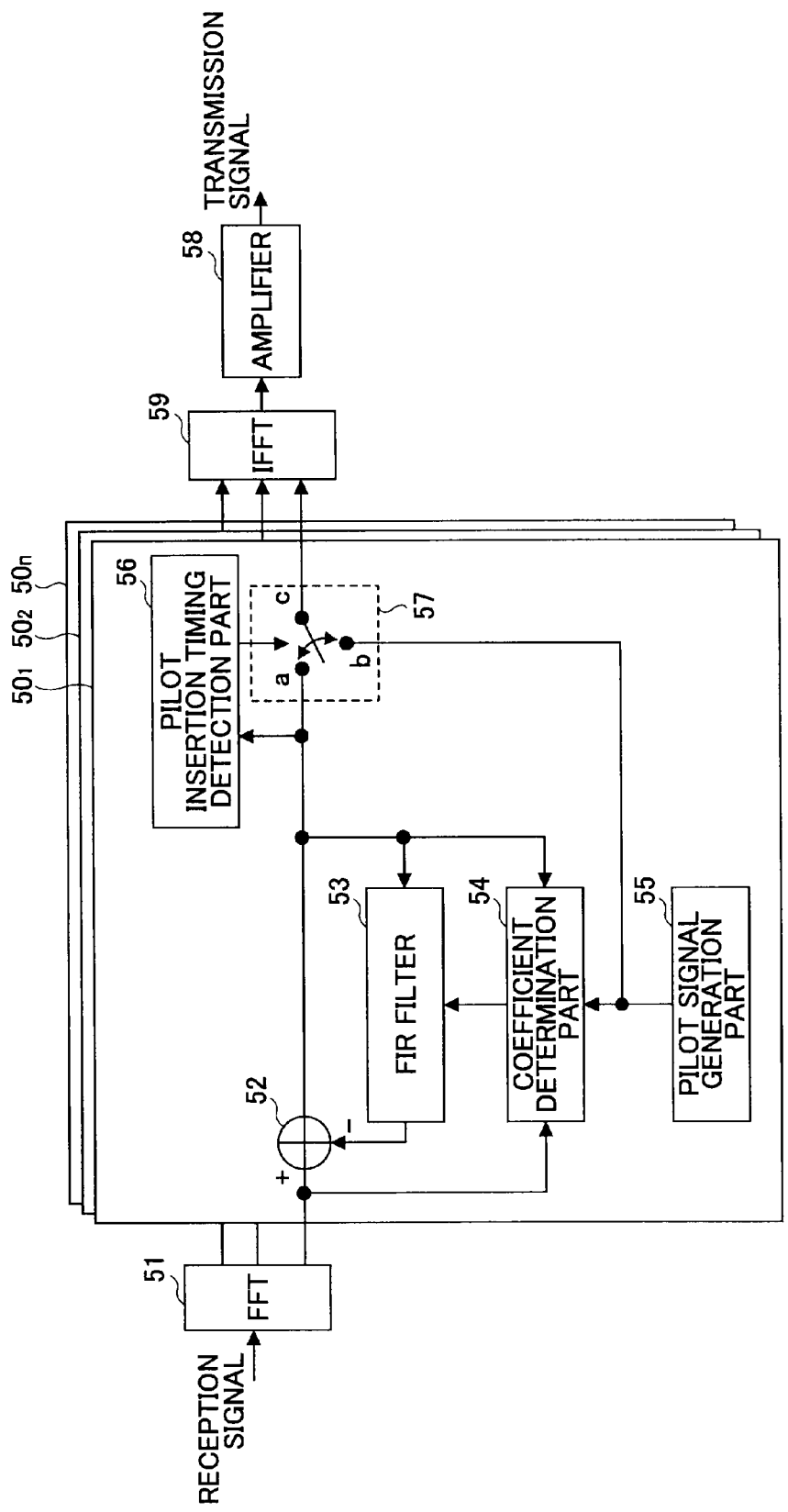

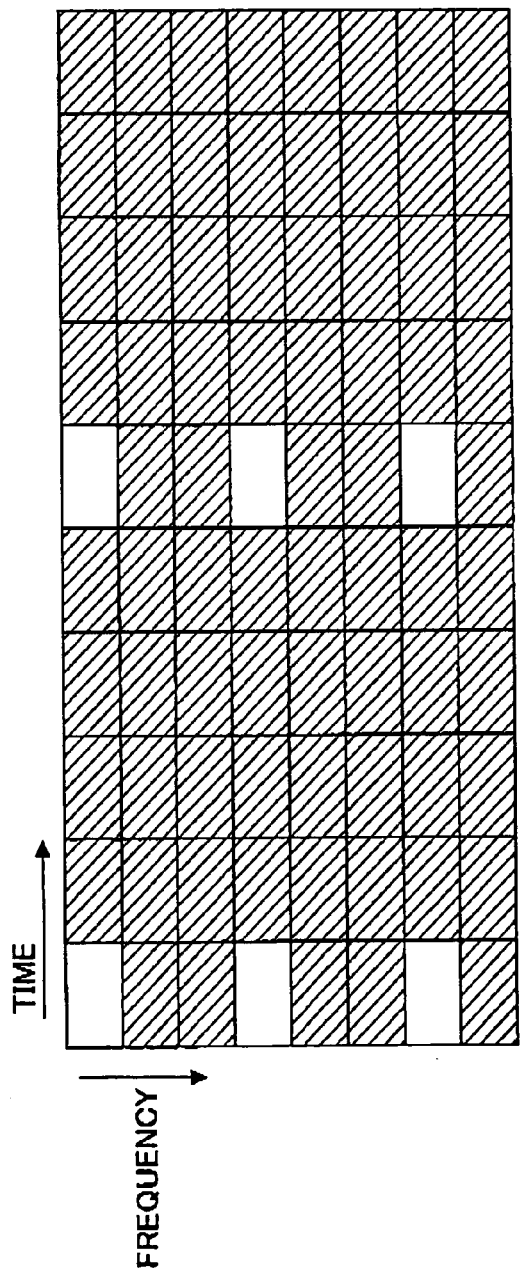

WIRELESS RELAY SYSTEM, WIRELESS RELAY APPARATUS, AND WIRELESS RELAY METHOD

BACKGROUND OF THE INVENTION

1. Field of the Invention

The present invention generally relates to a wireless relay system, a wireless relay apparatus, and a wireless relay method for wireless communication between a transmission apparatus and a reception apparatus via a single or a plurality of wireless relay apparatuses.

2. Description of the Related Art

Recently and continuing, a method of executing relay between a transmission apparatus and a reception apparatus by using the same frequency band with a wireless relay apparatus (=relay device) is being considered. In employing the wireless relay apparatus, it is important to control oscillation created by a coupling loop interference wave from a transmitter antenna to a receiver antenna. That is, a characteristic degraded by generation of oscillation is a problem.

Furthermore, since the relay is considered as a method that is mainly employed for broadcasting, controlling the coupling loop interference wave is relatively easy. Meanwhile, in a case where the wireless relay apparatus is situated in the same environment (not a steel tower or on top of a building) as a typical mobile terminal, such as in a mobile communication system, changes of channel of the coupling loop interference wave become more frequent in accordance with movement of the wireless relay apparatus or changes of the surrounding environment. There is a problem in which a highly advanced technology of canceling the coupling loop interference wave is required for swiftly corresponding to abrupt changes of the coupling loop interference wave.

In order to solve the problems of the conventional wireless relay apparatus, various methods are proposed.

For example, a method of canceling the coupling loop interference wave, which uses a pilot signal inserted by a transmitter apparatus, is proposed (See, for example, Japanese Laid-Open Patent Application Nos. 2003-174392 and 2003-298548). Japanese Laid-Open Patent Application No. 2003-174392 focuses on amplitude and phase being inserted into a predetermined pilot signal beforehand, in which an error signal is obtained by detecting frequency characteristics throughout the entire signal band by using the pilot signal, multipath components of transmission signals from a master station and other relay stations and a replica signal of the coupling loop interference wave are generated, and the replica signal is subtracted from the reception signal. Accordingly, even in a propagation environment where a large number of coupling loop interference waves exist or even in a propagation environment where multipath components of the main station transmission signal exist, the influences of both the coupling loop interference waves and the multipath components of the master station transmission signal can be eliminated.

According to Japanese Laid-Open Patent Application No. 2003-298548, a subtractor for subtracting duplications of coupling loop interference signals from input signals, an FIR filter for generating duplications of coupling loop interference signals, and a filter coefficient generation part for generating an FIR filter from the output of the subtractor are provided. The filter coefficient generation part performs a hard decision and remodulates a data carrier, calculates a transmission path characteristic by referring to the re-modulated data carrier, calculates cancellation residue from the transmission path characteristic, and updates the coefficient of the FIR filter based on the results of applying IFFT to the cancellation residue. Accordingly, a coupling loop canceller enables tracking performance to be improved and cancelable delay time to be expanded.

A configuration of a conventional wireless relay apparatus, which uses a coupling loop cancellation method by using a pilot signal inserted by a transmitter apparatus, is described below.

FIG. 15 is block diagram showing a configuration of a conventional wireless relay apparatus. As shown in FIG. 15, the wireless relay apparatus includes a subtractor 201 for subtracting a replica of a coupling loop interference signal from an input signal, an FIR filter 202 for generating the replica of the coupling loop interference signal, a coefficient update part 203 for generating a coefficient of the FIR filter 202, a pilot signal generation part 204 for generating a pilot signal with an amplitude and phase that are predefined, and an amplifier 205.

In the conventional wireless relay apparatus, the coefficient update part 203 obtains a characteristic of a transmission path, calculates a cancellation residue from the characteristic of the transmission path, and updates the coefficient of the FIR filter 202. Accordingly, tracking performance can be improved and cancelable delay time can be expanded.

As for other methods, there are a method of estimating a coupling loop interference by adding a pilot signal (a relatively long PN sequence with low electric power) to a relay signal of a wireless relay apparatus (see, for example, Japanese Laid-Open Patent Application No. 2001-186073); a method of estimating a coupling loop interference wave by transmitting a pilot signal from a wireless relay apparatus with a different frequency band (see, for example, Japanese Laid-Open Patent Application No. 8-331016); and a method of estimating a coupling loop interference wave by temporarily stopping relay (see, for example, Japanese Laid-Open Patent Application No. 2000-244382).

However, the coupling loop cancellation method disclosed in Japanese Laid-Open Patent Application No. 2003-174392 has a problem of increasing noise in the receiver.

In the coupling loop cancellation method disclosed in Japanese Laid-Open Patent Application No. 2003-298548, a part of noise voltage of a sub-carrier will be excessively amplified and transmitted since a transmission signal is amplified stronger as the signal received by a wireless relay apparatus becomes weaker. Accordingly, the bit error rate tends to increase.

Furthermore, the coupling loop cancellation method disclosed in Japanese Laid-Open Patent Application No. 2001-186073 has a problem of increasing the error rate in the receiver apparatus by applying a disturbance to a signal that is to be originally transmitted.

Furthermore, in the coupling loop cancellation method disclosed in Japanese Laid-Open Patent Application No. 8-331016, since the estimated channel value relies on a frequency that is used, accuracy in estimating the channel of the coupling loop is liable to deteriorate, and preparation of a frequency band for estimating the coupling loop interference wave would be necessary.

Furthermore, in the coupling loop cancellation method disclosed in Japanese Laid-Open Patent Application No. 2000-244382, there is a problem that communication between a transmitter apparatus and a receiver apparatus is temporarily interrupted at a timing unexpected by the transmitter apparatus.

SUMMARY OF THE INVENTION

It is a general object of the present invention to provide a wireless relay system, a wireless relay apparatus, and a wireless relay method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a wireless relay system, a wireless relay apparatus, and a wireless relay method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a wireless relay system for relaying a radio signal transmitted from a first wireless station to a second wireless station via a wireless relay apparatus, the wireless relay system including: a relay control part for receiving transmission symbols transmitted from the first wireless station and refraining from relaying a portion of the symbols; a pilot signal transmission part for transmitting a pilot signal that is inserted into a section of the portion of the transmission symbols; a coupling loop interference wave estimation part for receiving the pilot signal and estimating a coupling loop interference wave based on the pilot signal; and a coupling loop interference wave cancellation part for subtracting the estimated coupling loop interference wave from a reception signal.

In the wireless relay system according to an embodiment of the present invention, the first wireless station may include a control signal transmission part for transmitting a control signal that is included in the transmission symbols transmitted to the wireless relay apparatus, wherein the wireless relay apparatus includes a relay refrain control part for refraining from relaying the radio signals in a section of the control signal.

In the wireless relay system according to an embodiment of the present invention, the control signal transmission part may include a frame generation part for generating a frame of the transmission symbols with a null symbol inserted therein, wherein the relay refraining control part includes a relay refraining part for refraining relay of signals in a section where the null signal is inserted.

In the wireless relay system according to an embodiment of the present invention, the wireless relay apparatus may include a delay part for delaying the relay of the transmission symbols to an extent of N symbols, wherein N represents an integer which is not less than 1.

In the wireless relay system according to an embodiment of the present invention, in a case of relaying a signal by using an OFDM transmission method, the wireless relay apparatus may include an IFFT part for performing an IFFT process to generate the transmission signal, and an FFT part for performing an FFT process on the reception signal, and the first wireless station includes an OFDM frame generation part for inserting a null signal into a portion of a time/frequency domain and generating a frame that is to be transmitted to the wireless relay apparatus.

In the wireless relay system according to an embodiment of the present invention, the OFDM frame generation part may calculate a sub-carrier interval for inserting the the null signal in accordance with a formula of ceil {(FFT point value)/(GI point value)}, wherein "ceil (x)" represents a numeric function that returns a least integer greater than x, "FFT" represents Fast Fourier Transform and "GI" represents guard interval.

In the wireless relay system according to an embodiment of the present invention, the wireless relay apparatus may include a channel estimation part for receiving the pilot signal and estimating a channel in accordance with the received pilot signal, and a signal amplitude control part for controlling an amplitude of the reception signal based on a result of the channel estimation by the channel estimation part.

In the wireless relay system according to an embodiment of the present invention, the signal amplitude control part may employ a water filling theorem for controlling the amplitude of the reception signal.

In the wireless relay system according to an embodiment of the present invention, the first wireless station, the second wireless station, and the wireless relay apparatus each may include a plurality of antennas, wherein the antennas are used to form a MIMO channel, wherein the relay control part, a pilot signal transmission part, the coupling loop interference wave estimation part, and the coupling loop interference wave cancelation part are employed when executing transmission of MIMO channel signals.

Furthermore, the present invention provides a wireless relay apparatus for relaying a radio signal transmitted from a first wireless station to a second wireless station, the wireless relay apparatus including: a relay control part for receiving transmission symbols transmitted from the first wireless station and refraining from relaying a portion of the symbols; a pilot signal transmission part for transmitting a pilot signal that is inserted into a section of the portion of the transmission symbols; a coupling loop interference wave estimation part for receiving the pilot signal and estimating a channel impulse response of coupling loop interference wave based on the pilot signal; and a coupling loop interference wave cancellation part for subtracting the estimated coupling loop interference wave from a reception signal.

Furthermore, a wireless relay method for relaying a radio signal transmitted from a first wireless station to a second wireless station, the wireless relay method comprising the steps of: a) receiving transmission symbols transmitted from the first wireless station; b) refraining from relaying a portion of the symbols; c) transmitting a pilot signal that is inserted into a section of the portion of the transmission symbols; d) receiving the pilot signal; e) estimating a coupling loop interference wave based on the pilot signal; and f) subtracting the estimated coupling loop interference wave from a reception signal.

Other objects and further features of the present invention will be apparent from the following detailed description when read in conjunction with the accompanying drawings.

BRIEF DESCRIPTION OF THE DRAWINGS

FIG. 4 is a drawing showing an exemplary configuration of a transmission frame according to a first embodiment of the present invention;

FIG. 5 is a drawing showing an exemplary configuration of a wireless relay apparatus according to a second embodiment of the present invention;

FIG. 6 is a drawing showing an exemplary configuration of a transmission frame according to a second embodiment of the present invention;

DESCRIPTION OF THE PREFERRED EMBODIMENTS

In the following, embodiments of the present invention are described with reference to the accompanying drawings.

First Embodiment

Figure 1:
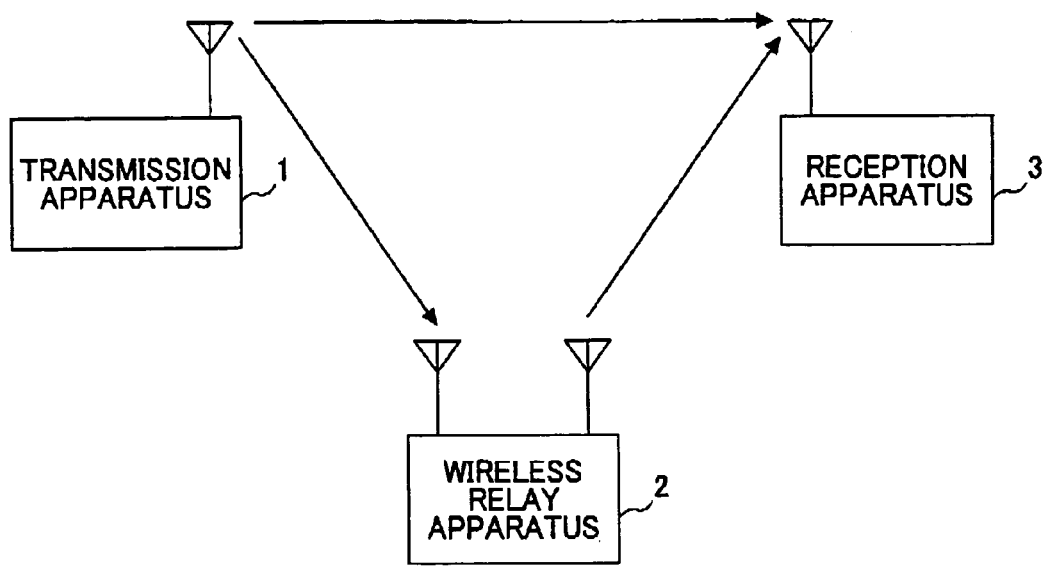
FIG. 1 is drawing showing an exemplary configuration of a wireless relay system including a wireless relay apparatus according to a first embodiment of the present invention.

An example of a wireless relay system according to a first embodiment of the present invention is shown in FIG. 1. In FIG. 1, the wireless relay system includes a transmission apparatus 1, a wireless relay apparatus 2, and a reception apparatus 3.

The transmission apparatus 1 and the reception apparatus 3 in the first embodiment of the present invention are described below by assuming that the relation between the transmission apparatus 1 and the reception apparatus 3 is a relation of a base station (transmission apparatus 1) and a mobile station (reception apparatus 3).

The signals received by the reception apparatus 3 include a signal directly received from the transmission apparatus 1 and a signal received via the wireless relay apparatus 2. A signal transmitted from the transmission apparatus 1 is first received in the wireless relay apparatus 2, and is retransmitted to the reception apparatus 3 at the same frequency. Furthermore, the wireless relay system of the first embodiment of the present invention is a system in which signal relay is executed according to a single carrier transmission method or a multicarrier transmission method (e.g. OFDM transmission method).

Figure 2:
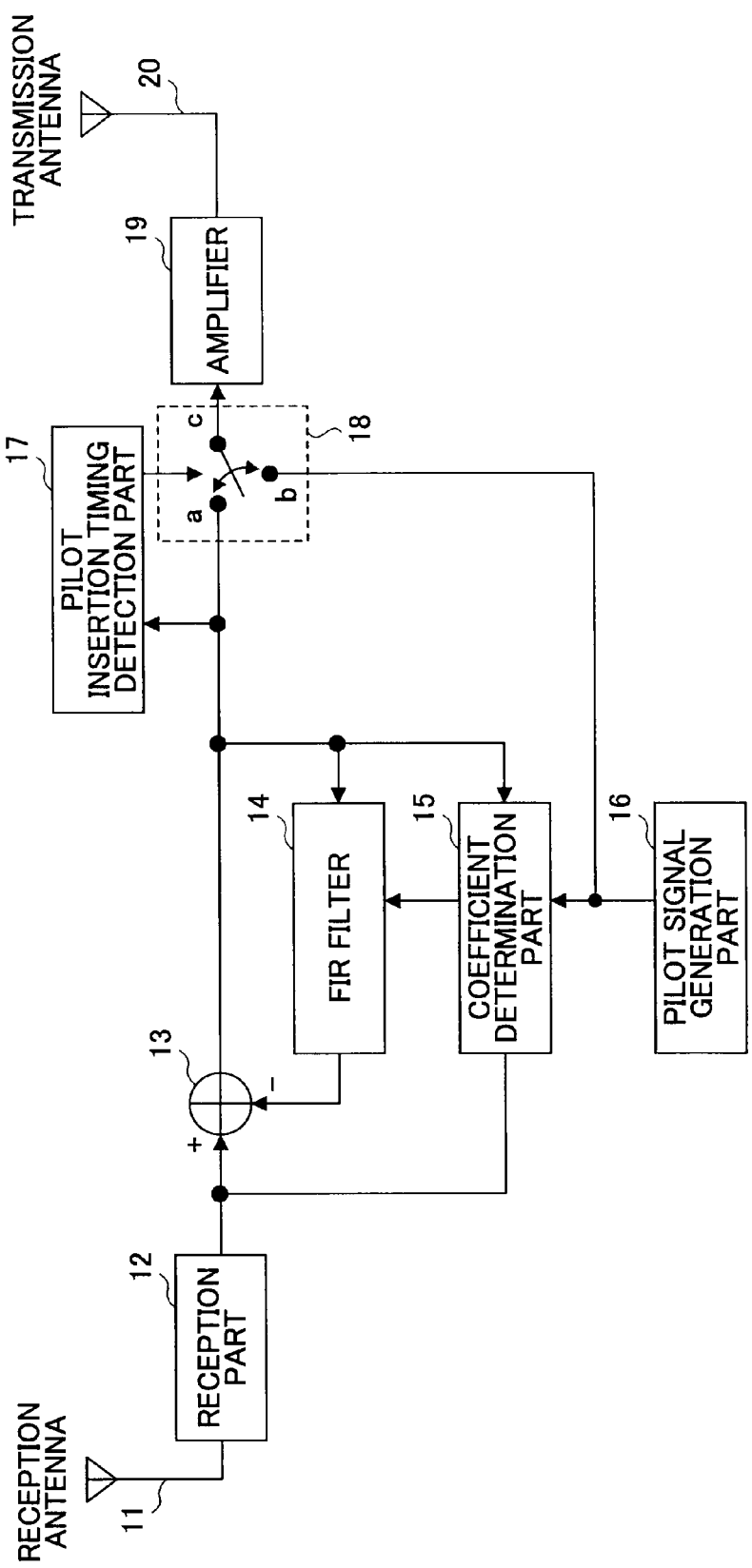
FIG. 2 is a drawing showing an exemplary configuration of the wireless relay apparatus shown in FIG. 1.

FIG. 2 is a drawing showing an exemplary configuration of the wireless relay apparatus 2 shown in FIG. 1.

In FIG. 2, the wireless relay apparatus 2 includes a reception antenna 11, a reception part 12, a subtractor 13, an FIR filter 14, a coefficient determination part 15, a pilot signal generation part 16, a pilot insertion timing detection part 17, a switch circuit 18, an amplifier 19, and a transmission antenna 20.

Figure 3A:
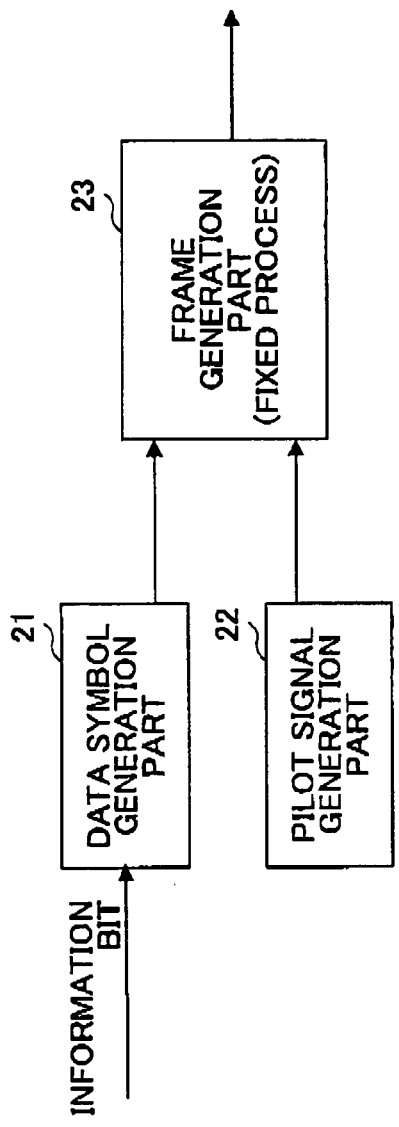
FIG. 3A is a drawing showing an exemplary configuration of a conventional transmission apparatus.

In the transmission apparatus 1 shown in FIG. 1 according to the first embodiment of the present invention, a null signal(s) is inserted into a transmission frame. First, this insertion of the null signal is described with reference to FIGS. 3A, 3B and 4. FIG. 3A is a drawing showing an exemplary configuration of a conventional transmission apparatus, FIG. 3B is a drawing showing an exemplary configuration of a transmission apparatus 1 of the present invention, and FIG. 4 is a drawing showing an exemplary configuration of a transmission frame according to the first embodiment of the present invention.

As shown in FIG. 3A, the conventional transmission apparatus includes a data symbol generation part 21 for receiving input of information bits and generating a data symbol, a pilot signal generation part 22 for generating a pilot signal, and a frame generation part 23 for generating a transmission frame. The frame generation part 23 forms the transmission frame by multiplexing the data symbol output from the data symbol generation part 21 and the pilot signal output from the pilot signal generation part 22.

Figure 3B:
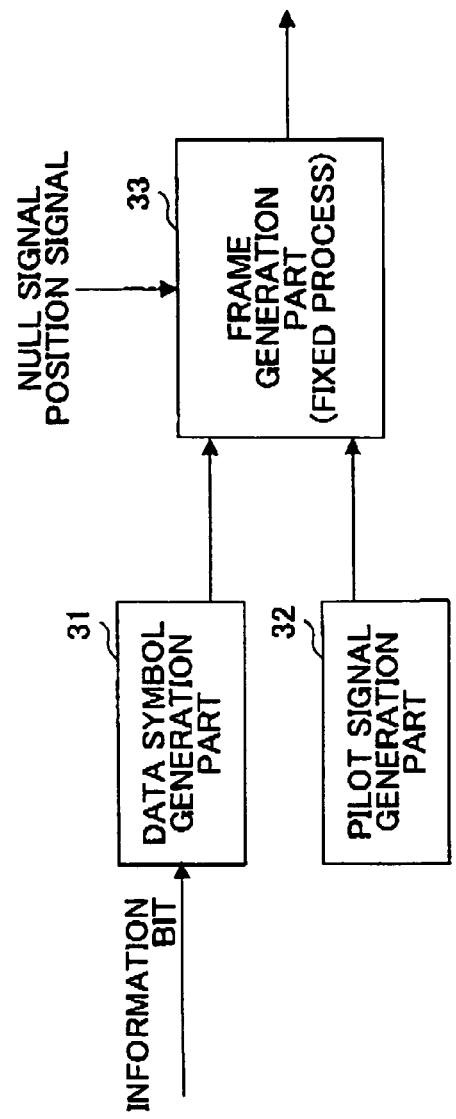
FIG. 3B is a drawing showing an exemplary configuration of a transmission apparatus according to an embodiment of the present invention.

Meanwhile, although the transmission apparatus 1 according to the first embodiment of the present invention has a basic configuration similar to that of the conventional transmission apparatus, as shown in FIGS. 3A and 3B, the transmission apparatus 1 executes a different frame generation process at a frame generation part 33. That is, the frame generation part 33 according to the first embodiment of the present invention inserts a null signal in a transmission frame, multiplexes the transmission frame with a null signal position signal that includes information regarding the position at which the null signal is inserted, and transmits the transmission frame (See FIG. 3B). The null signal position information includes, for example, the number of null signals, the time of null signals, or the interval of null signal insertion in a frequency direction.

FIG. 4 is a drawing showing an exemplary configuration of a transmission frame generated by the frame generation part 33 in the above-described manner. As shown in FIG. 4, the frame generation part 33 according to the first embodiment of the present invention m null symbols (illustrated as an outlined white space) (for example, m=1) at intervals of N symbols (illustrated as a diagonal line space). A pilot signal is inserted in the section of the null signal by the wireless relay apparatus 2 (described in further detail below).

Although m null symbols are inserted between each N symbol section in the example of the first embodiment of the present invention, the value of m null symbols may be set in accordance with a desired accuracy for estimating the coupling loop interference wave. For example, in a case where high accuracy is desired for estimating the coupling loop interference wave, m is set with a large value. For example, in a case where m is set as m>2, channel estimation accuracy can be heightened by obtaining the average of the channel estimation value obtained from m pilot signals and the estimation value of each channel.

Furthermore, the value of the m null symbols is required to be set with a fixed value, but may alternatively be a value that is changed adaptively. For example, in a case where estimation accuracy of coupling loop interference wave is poor, bit error rate may increase even if reception power is secured in the reception apparatus 3; therefore, the value of m null symbols may be controlled in accordance with reception power in the reception apparatus 3 and the bit error rate. In this case, the transmission apparatus 1 changes the value of the m null symbols based on information indicative of reception power and bit error rate transmitted from the reception apparatus 3.

Furthermore, since a coupling loop interference wave is received in the wireless relay apparatus 2 in a case where accuracy for estimating the coupling loop interference wave is poor, decrease in estimation accuracy of the coupling loop interference wave channel can be detected by obtaining a correlation between a reception waveform of a received signal and a time waveform of a reception signal received in the wireless relay apparatus 2 at a previous predetermined time.

Meanwhile, although N may be set as the frame size, N can be set in accordance with fluctuation velocity of the coupling loop interference wave of the wireless relay apparatus 2 (fluctuation velocity in a case where fluctuation velocity of the coupling loop interference wave fluctuates in accordance with travel speed of the wireless relay apparatus and the transmission apparatus). For example, in this case, N may be set as N<(frame size), and m null symbols may be inserted in plural portions in a single frame.

In general, the fluctuation amount of the coupling loop interference wave is indicated by the difference of impulse response of the coupling loop interference wave between a time point t1 and a time point t1+Δt. Therefore, by obtaining a difference of channel estimation value between the current and previous coupling loop interference wave with respect to the impulse signals, and using the squared sums of the obtained values as an index, the fluctuation velocity of the coupling loop interference wave can be estimated.

Accordingly, by allowing the wireless relay apparatus 2 to detect fluctuation velocity of the coupling loop interference wave and report the detection results to the transmission apparatus 1, the value of N can be adaptively variable in accordance with fluctuation velocity of the coupling loop interference wave.

Next, operation of the wireless relay apparatus 2 is described with reference to FIG. 2. The wireless relay apparatus 2 receives a relay signal transmitted from the transmission apparatus 1 at the reception part 12 via the reception antenna 11. The relay signal received at the reception part 12 is input to the pilot insertion timing detection part 17. The pilot insertion timing detection part 17 extracts the null signal position signal from the input relay signal and detects the insertion position of the null signal. The pilot insertion timing detection part 17 transmits the pilot signal generated at the pilot signal generation part 16 instead of a reception signal during the period where the null signal is inserted. In order to do so, the pilot insertion timing detection part 17 connects point c and b in the switch circuit 18 in the insertion section of the null signal.

A pilot signal is generated in the pilot signal generation part 16. The generated pilot signal is inserted within the period of the null signal and is input to the amplifier 19. Then, the amplifier 19 amplifies the pilot signal to a desired electric power value, and transmits the pilot signal via the transmission antenna 20.

Furthermore, at the same time of executing the above-described operation, the coefficient determination part 15 estimates the channel of the coupling loop interference wave (transmission path characteristic) that fluctuates in accordance with, for example, changes in the surrounding environment, by referring to the reception signal corresponding to the pilot signal, and determines the coefficient of the FIR filter indicating said channel, that is, the filter coefficient that can cancel the coupling loop interference wave. That is, the FIR filter 14 is set with a coefficient so that the transfer function thereof is the same as that of the coupling loop interference wave.

The subtractor 13 subtracts the coupling loop interference wave (replica of the coupling loop interference wave) generated by the FIR filter 14 from the reception signal, thereby canceling the coupling loop interference. Then, a switch junction b of the switch circuit 18 is switched on. The reception signal having the replica subtracted therefrom is input to the amplifier 19, is amplified to a desired power level, and is transmitted to the transmission antenna 20.

Since the wireless relay apparatus 2 according to the first embodiment of the present invention transmits a pilot signal at the section in which the null signal is inserted, and at the same time, estimates the channel of the coupling loop interference wave in accordance with the reception signal corresponding to the pilot signal, the wireless relay apparatus 2 is able to estimate the coupling loop interference wave without interrupting communications between the transmission apparatus 1 and the reception apparatus 3.

Furthermore, since the wireless relay apparatus 2 cancels the coupling loop interference wave by generating a pseudo coupling loop interference wave with the FIR filter 14 in accordance with the estimated coupling loop interference wave and subtracting the output of the FIR filter 14 (output pseudo coupling loop interference wave) from a signal received by the wireless relay apparatus 2 with the subtractor 13, the wireless relay apparatus 2 can prevent oscillation due to the coupling loop interference wave with high accuracy. Accordingly, increases in bit error rate of the relay signal can be prevented, and reception quality of the relay signal can be enhanced.

It is to be noted that, since the signals prior to the first null symbol cannot be subjected to cancellation of the coupling loop interference wave, the signals may be excluded from being relayed and may be used to serve as a preliminary notification to the wireless relay apparatus 2

Second Embodiment

In a system executing OFDM communication, all transmission signals in a predetermined time do not need to be inserted with null signals, but alternatively, a symbol(s), which only forms a part of a sub-carrier, may be made into a null signal(s).

FIG. 5 is a drawing showing an exemplary configuration of a wireless relay apparatus according to a second embodiment of the present invention. FIG. 6 is a drawing showing an exemplary configuration of a transmission frame generated by a transmission frame generation part of a transmission apparatus according to the second embodiment of the present invention.

The wireless relay apparatus shown in FIG. 5 has a configuration similar to that of the wireless relay apparatus 2 according to the first embodiment of the present invention shown in FIG. 2, but is also provided with an FFT part 51 for performing an FFT process on a reception signal(s), and an IFFT part 59 for performing an IFFT process on a transmission signal(s). The parts, which suppress loop interference, are provided to each of the sub-carriers $50_1$-$50_n$. Here, points that are different from the first embodiment of the present invention are described in detail.

In FIG. 5, the IFFT part 59 performs IFFT (Inverse Fast Fourier Transform) on plural symbol data and transforms the symbol data into time domain signals (OFDM transmission signals). Meanwhile, the FFT part 51 performs FFT (Fast Fourier Transform) on reception signals and transforms the reception signals into frequency domain signals (OFDM reception signals).

Next, a configuration of a transmission frame according to the second embodiment of the present invention is described with reference to FIG. 6. FIG. 6 illustrates OFDM signals, before being subjected to the IFFT process, which are arranged in time and frequency domain. In FIG. 6, vertical axis shows frequency and vertical axis shows time. In FIG. 6, the diagonal line spaces represent data or pilot symbols, and the outlined white spaces represent null symbols.

Here, the frequency interval of the sub-carriers is determined in accordance with, for example, a formula described below;

ceil {(sub-carrier number)/(GI point number)}, wherein "ceil (x)" represents a numeric function that returns a least integer greater than x, and "GI" represents guard interval.

In a case where the values of channel estimations in an interval of ceil{(subcarrier number)/(GI point number)} are obtained, it is ideal to estimate the channels of all sub-carriers by interpolating these values. However, since channel estimation accuracy may deteriorate depending on the interpolation method, null signals may be suitably inserted in a shorter frequency interval.

Since null signals are included only in a portion of the symbols of the sub-carriers, the present invention can decrease the loss of throughput due to the null symbol insertion. Accordingly, such a system can attain the same advantages as those of the first embodiment of the present invention.

Third Embodiment

Although the second embodiment of the present invention is described supposing the same power amplification factor is allocated against all subcarriers, in a case where OFDM transmission is employed, a wireless relay apparatus according to a third embodiment of the present invention changes the electric power amplification factor of each sub-carrier for attaining a more satisfactory communications quality. That is, the wireless relay apparatus according to the third embodiment of the present invention has a function of controlling the electric power amplification factor of each sub-carrier.

Figure 7:
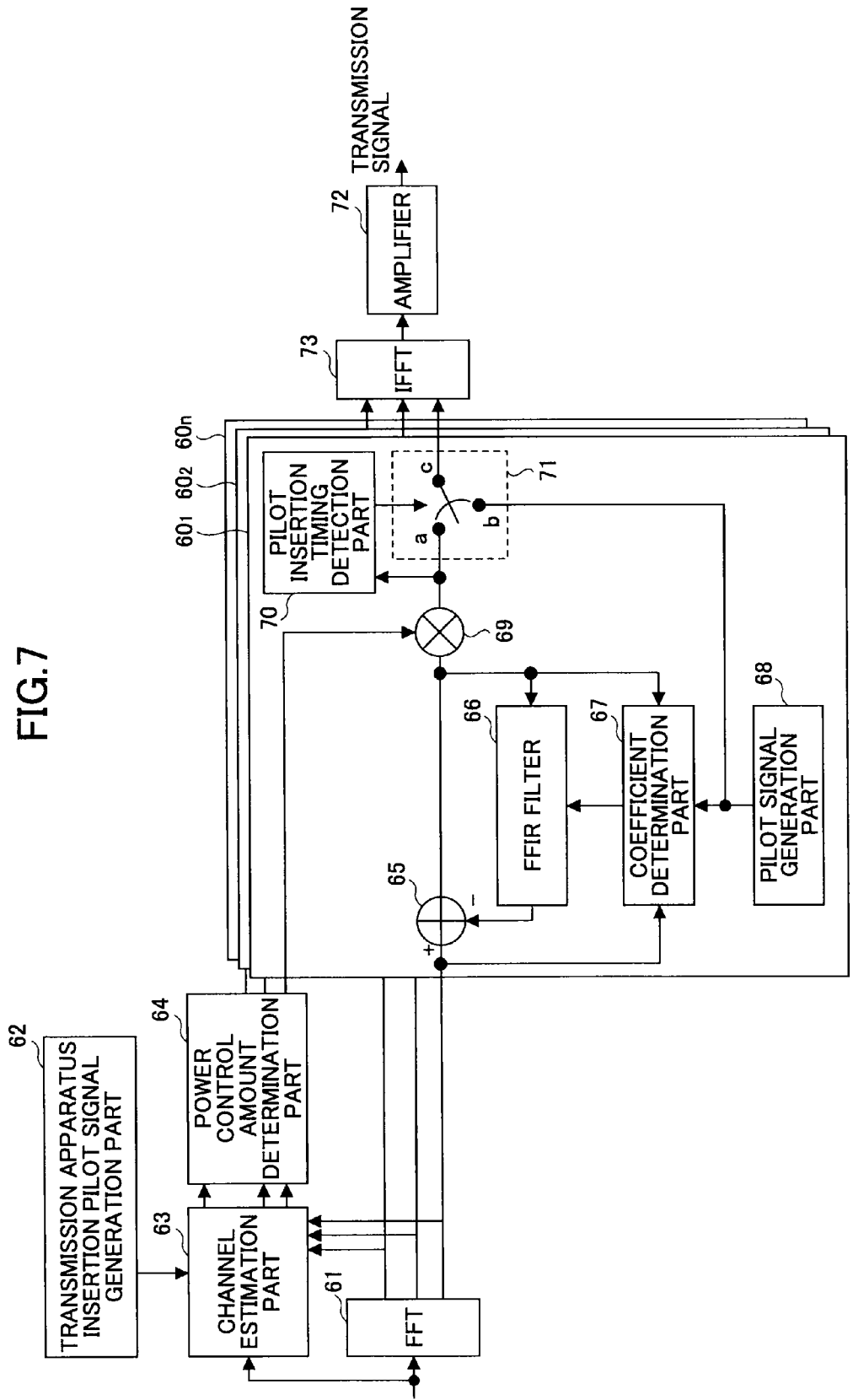
FIG. 7 is a drawing showing an exemplary configuration of a wireless relay apparatus according to a third embodiment of the present invention.

As shown in FIG. 7, the wireless relay apparatus according to the third embodiment of the present invention has a configuration similar to that of the wireless relay apparatus 2 according to the second embodiment of the present invention shown in FIG. 5, but is also provided with a transmission apparatus insertion pilot signal generation part 62 which generates the same pilot signals inserted by the transmission apparatus, a channel estimation part 63, a power control amount determination part 64, and a multiplier 69 for multiplying the power control amount determined in the power control amount determination part 64 and a reception signal(s). Next, points that are different from the second embodiment of the present invention shown in FIG. 5 are described in detail.

In FIG. 7, first, a pilot signal(s) inserted in the transmission apparatus is generated in the transmission apparatus insertion pilot signal generation part 62. The channel estimation part 63 estimates the channel between the transmission apparatus and the wireless relay apparatus in accordance with the reception signal corresponding to the pilot signal, and outputs the estimation result to the power control amount determination part 64. The power control amount determination part 64 determines the amount of power to be provided for each sub-carrier based on the state of the channel of each sub-carrier obtained from the channel estimation part 63. In determining the power control amount, a water filling theorem, for example, may be employed for obtaining a suitable result. The power control amount in a case of employing the water filling theorem can be expressed with the formula shown below.

Power control amount=(reception power of each sub-carrier) 0.5×(constant)

Here, the constant is a value determined by a condition of making the relay gain in all bands constant. Furthermore, such value may be controlled by a feedback signal that is transmitted from a reception apparatus based on the reception quality of the reception apparatus.

The power control amount determined by the above-described formula is multiplied by a reception signal at the multiplier 69 and is input to an amplifier 71. Subsequent operations are the same as those described above in the foregoing embodiments.

In the system executing OFDM communication according to the third embodiment of the present invention, reception quality for receiving relay signals can be enhanced at the reception side since the power amplification factor of the wireless relay apparatus is changed for each sub-carrier.

Fourth Embodiment

In each of the above-described embodiments of the present invention, the transmission apparatus constantly inserts null signals into the transmission frame even when relay is not executed constantly by the wireless relay apparatus Nevertheless, the present invention is not limited to such embodiments; alternatively, null signals may be inserted according to necessity.

Figure 8:
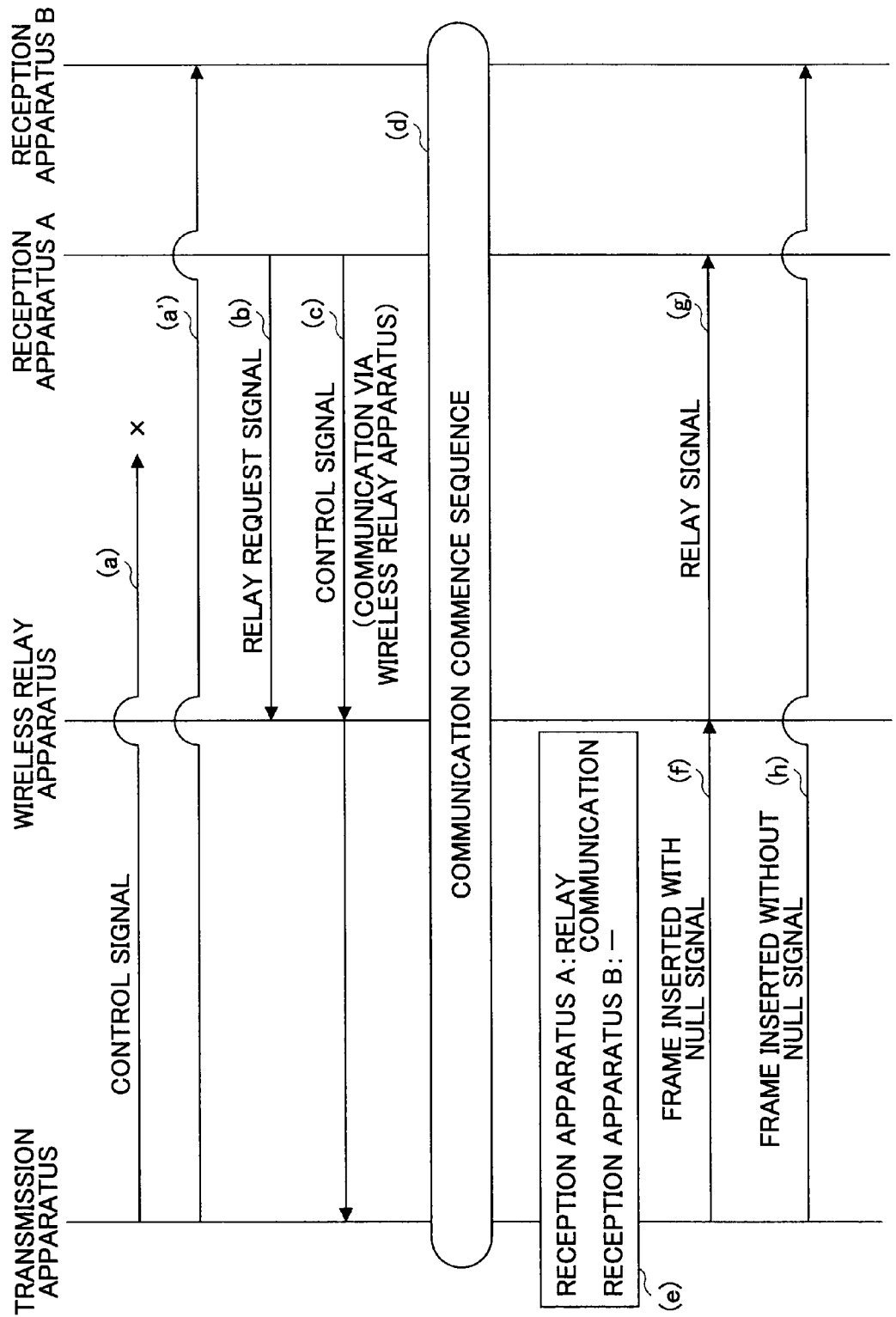
FIG. 8 is a sequence diagram for describing control of insertion of null signals according to a fourth embodiment of the present invention.

For example, as shown in a sequence diagram in FIG. 8, in a case where a reception apparatus A is unable to receive a control signal from a transmission apparatus ((a) in FIG. 8), the reception apparatus A transmits a predetermined relay request signal to a wireless relay apparatus ((b) in FIG. 8). Furthermore, before the reception apparatus A commences communication ((d) in FIG. 8), the reception apparatus A informs the transmission apparatus that the communication which is going to be commenced will be executed via the wireless relay apparatus by using a control signal ((c) in FIG. 8). By doing so, the transmission apparatus is able to know that the reception apparatus A requests relay via the wireless relay apparatus.

Meanwhile, the reception apparatus B does not transmit the above-described relay request signal since the reception apparatus B is able to receive a control signal from the transmission apparatus ((a') in FIG. 8). The transmission apparatus is able to know that the reception apparatus B has not requested relay via the wireless relay apparatus since no signal corresponding to (c) is received.

The transmission apparatus stores information whether or not terminal requires relay (for example, using a table) ((e) in FIG. 8). The transmission apparatus transmits a transmission frame being inserted with null signals ((f), (g) in FIG. 8) to a reception apparatus that is requesting communication via a wireless relay apparatus (in this example, reception apparatus A). The transmission apparatus transmits a transmission frame without insertion of null signals ((h) in FIG. 8) to a reception apparatus that is directly communicating with the transmission apparatus (in this example, reception apparatus B).

Accordingly, loss of throughput due to insertion of null signals can be prevented with respect to the reception apparatus that does not communication via the wireless relay apparatus.

The fourth embodiment of the present invention also requires to constantly insert null signals into the relay frame of the control signal, or to employ another method or part for canceling coupling loop interference.

Figure 9:
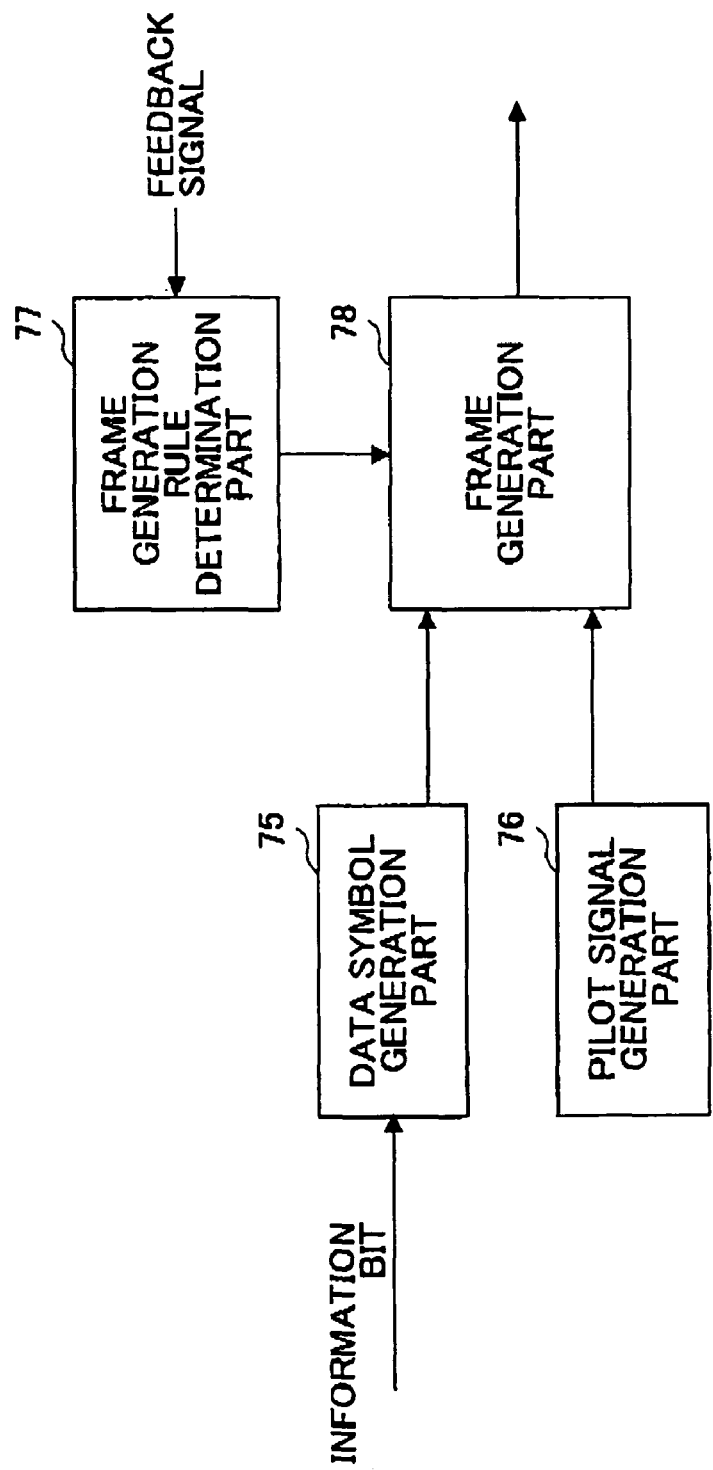
FIG. 9 is a drawing showing an exemplary configuration of a transmission apparatus according to a fourth embodiment of the present invention.

FIG. 9 is a drawing showing an exemplary configuration of a transmission apparatus according to the fourth embodiment of the present invention. The transmission apparatus according to the fourth embodiment of the present invention has a configuration which is basically the same as that of the transmission apparatus shown in FIG. 3, except that a frame generation rule determination part 77 is added. The frame generation rule determination part 77 has a function of determining whether null signals are inserted.

The frame generation rule determination part 77, as shown in the sequence diagram in FIG. 8, monitors relay request signals from each reception apparatus (here, the signals are referred to as feedback signals from the reception apparatus), determines whether null signals are inserted with respect to each of the reception apparatuses using, for example, a table. Furthermore, the frame generation rule determination part 77 outputs the determination results to a frame generation part 78 at a predetermined timing. In accordance with the determination results output from the frame generation rule determination part 77, the frame generation part 78 controls insertion of null signals into the transmission frame.

According to the fourth embodiment of the present invention, overhead due to insertion of null signals can be reduced for a reception apparatus that does not communicate via a wireless relay apparatus; thereby the throughput of the reception apparatus can be enhanced.

Fifth Embodiment

Figure 10:
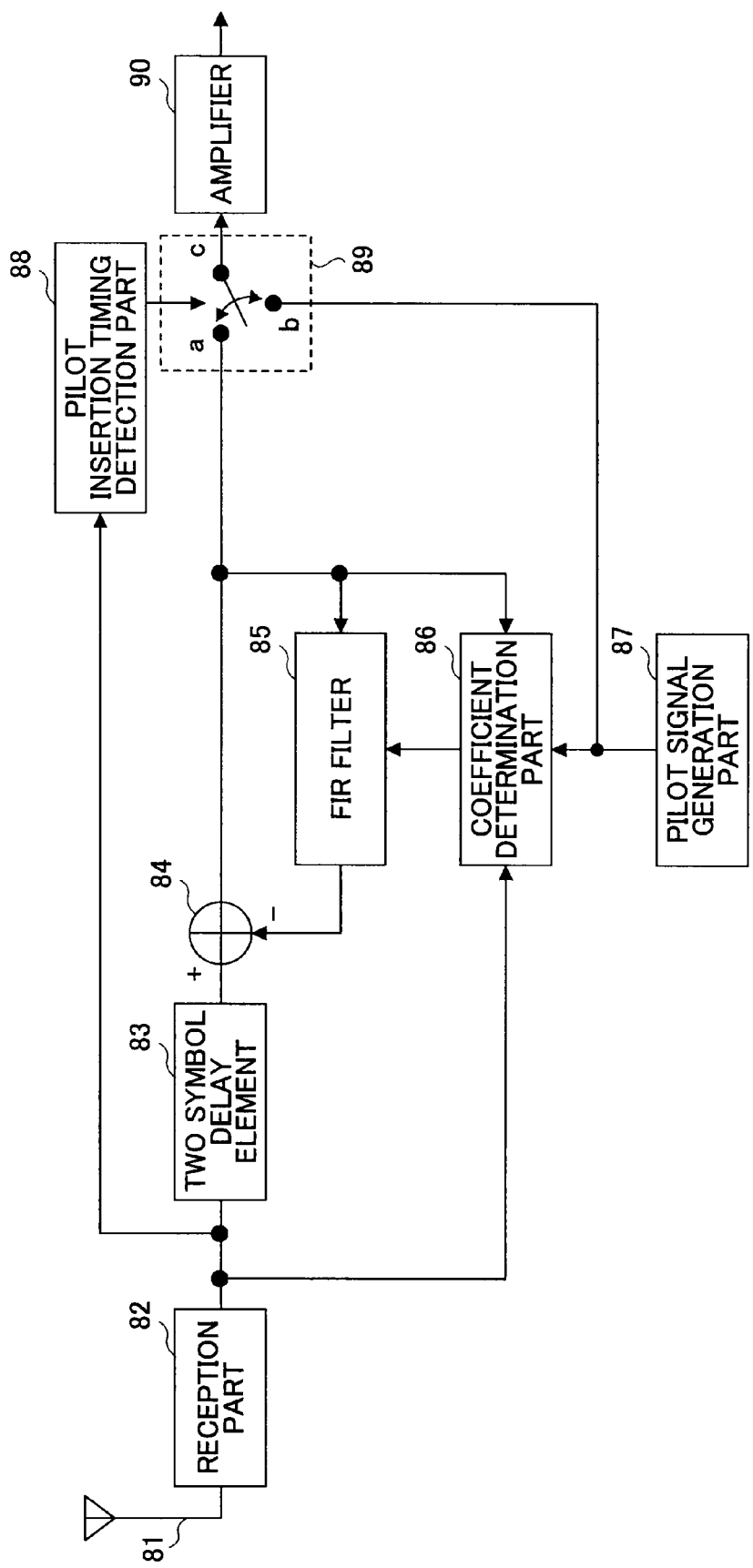
FIG. 10 is a drawing showing an exemplary configuration of a wireless relay apparatus according to a fifth embodiment of the present invention.

FIG. 10 is a drawing showing an exemplary configuration of a wireless relay apparatus according to a fifth embodiment of the present invention.

In FIG. 10, the wireless relay apparatus includes a reception antenna 81, a reception part 82, a two symbol delay element 83, a subtractor 84, an FIR filter 85, a coefficient determination part 86, a pilot signal generation part 87, a pilot insertion timing detection part 88, a switch circuit 89, and an amplifier 90.

Here, the fifth embodiment of the present invention is different from the foregoing embodiments in that the two symbol delay element 83 is included. A delay operation of the two symbol delay element 83 is described with reference to FIGS. 11A-11F. In FIGS. 11A-11F, letter D indicates a delay element (Delay Line). Since the fifth embodiment of the present invention employs the two symbol delay element 83, letter D is serially allocated in two steps.

Figure 11:
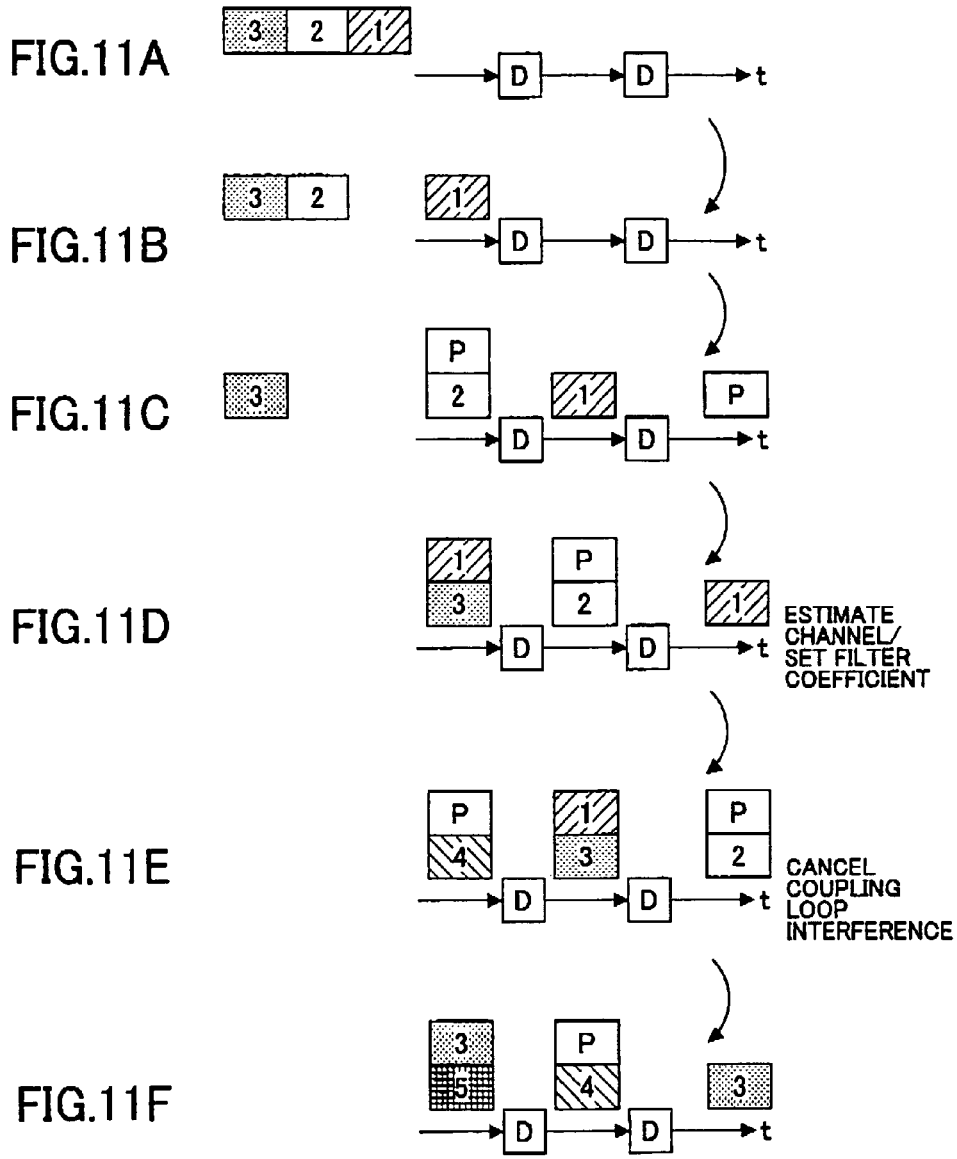
FIGS. 11A-11F are drawings showing for describing delay operation according to a two symbol delay element according to a fifth embodiment of the present invention.

FIG. 11A shows an initial state prior to inputting symbols to the two symbol delay element 83. First, a reception of a first symbol in a forthcoming timing (FIG. 11B) triggers a delay of two symbols for the symbols input in the two symbol delay element 83. After the two symbol delay of the symbols in the two symbol delay element 83, a pilot signal (letter P) generated in a pilot signal generation part 87 is transmitted in a timing of receiving a second symbol (FIG. 11C).

By transmitting the pilot signal, the wireless relay apparatus receives a reception signal corresponding to the pilot signal in a timing of receiving the second symbol (in this case, the second symbol is a null signal). While a third symbol is being received in a reception part 82 of the wireless relay apparatus, a coefficient determination part 86 of the wireless relay apparatus estimates the channel of the coupling loop interference wave in accordance with the reception signal and the pilot signal, determines the coefficient of the FIR filter 85, and sets a coefficient capable of canceling the coupling loop interference wave, to an FIR filter 85 (FIG. 11D). In the timing for transmitting the second symbol, a coupling loop interference wave of the first symbol added to the reception signal of the third symbol is cancelled (FIG. 11E). Then, the third symbol is transmitted in a forthcoming timing (FIG. 11F).

The fifth embodiment of the present invention is effective in a case where no or very weak direct waves are transmitted from the transmission apparatus to the reception apparatus, and is also effective in a case where it is allowed a large process delay of the wireless relay apparatus, since digital signal processing is also executed in the wireless relay apparatus.

Sixth Embodiment

A sixth embodiment of the present invention is a case where MIMO (Multiple Input Multiple Output) channel signal transmission is applied to the wireless relay apparatus of the present invention. MIMO channel signal transmission is a signal transmission method in which multiple information sequences are wirelessly transmitted in the same frequency band by a transmission apparatus, and radio signals on the same frequency band are received and separated into respective information sequences by a reception apparatus.

Figure 12:
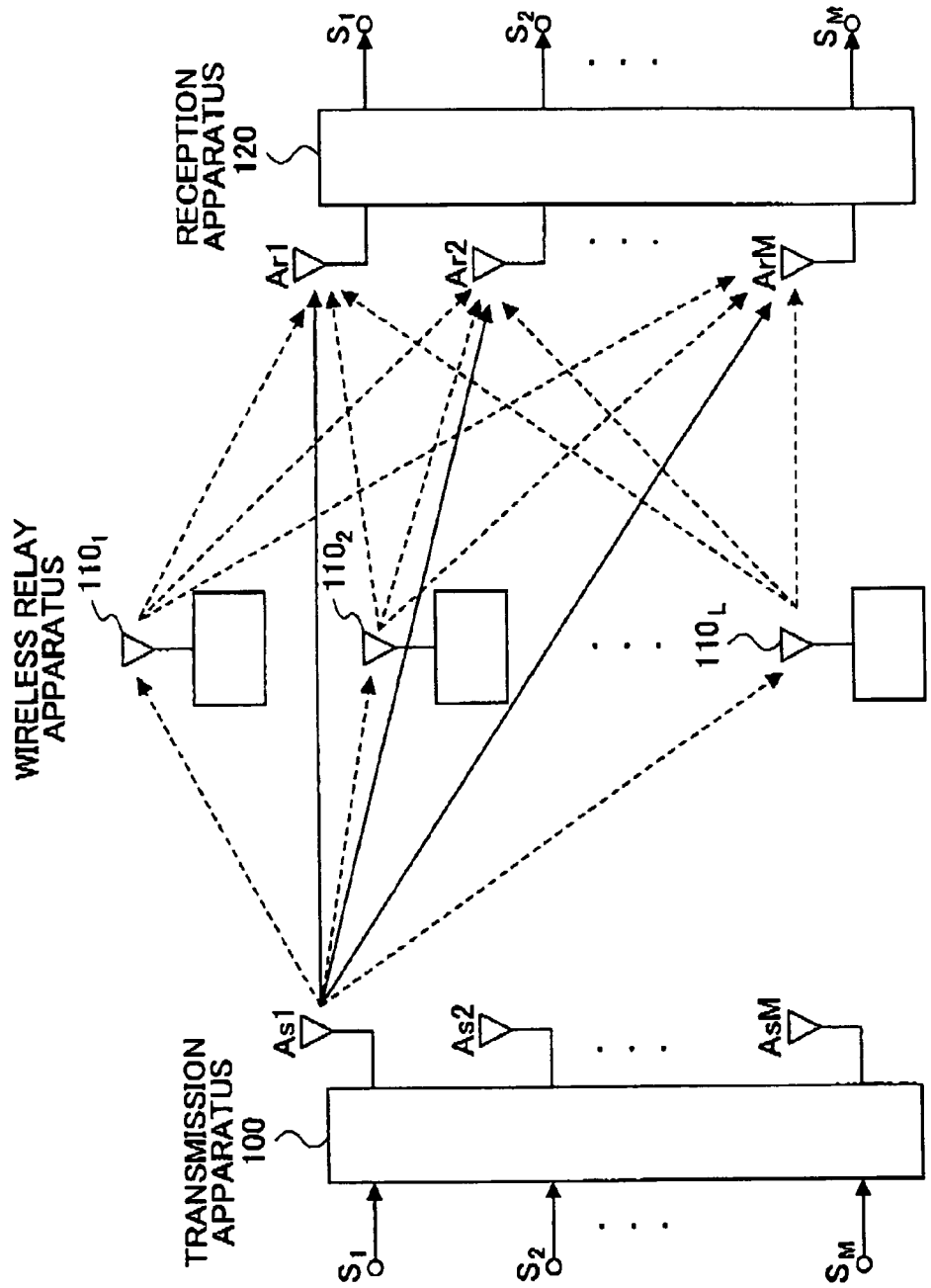
FIG. 12 is a drawing showing an exemplary configuration of a conventional multi-point relay transmission system according to an MIMO channel signal transmission method.

First, an operation of a conventional MIMO channel signal transmission method is described. FIG. 12 is a drawing showing an exemplary configuration of a multi-point relay transmission system according to the conventional MIMO channel signal transmission method.

In the multi-point relay transmission system shown in FIG. 12, a transmission apparatus 100 transmits M number (M being an integer which is not less than 2) of information sequences $S_1, \ldots S_M$ from its transmission antennas As1, ... AsM in the form of vertical polarized plane wave radio signals of the same frequency band. L number (L being an integer which is not less than 1) of wireless relay apparatuses 110$_1$, ... 110$_L$ receive M radio signals and temporarily store the radio signals. Then, when the transmission apparatus 100 stops transmission after a transmission amounting to a single message or a single burst is completed, the stored radio signals are amplified and transmitted to a reception apparatus 120 in the form of vertical polarized plane wave radio signals. A reception apparatus 120 receives the radio signals at its N number (N being an integer which is not less than M) of linearly polarized wave reception antennas Ar1, ... ArN and separates the received signals to M information sequences $S_1, \ldots S_M$ by applying an MIMO equalization process thereto.

Figure 13:
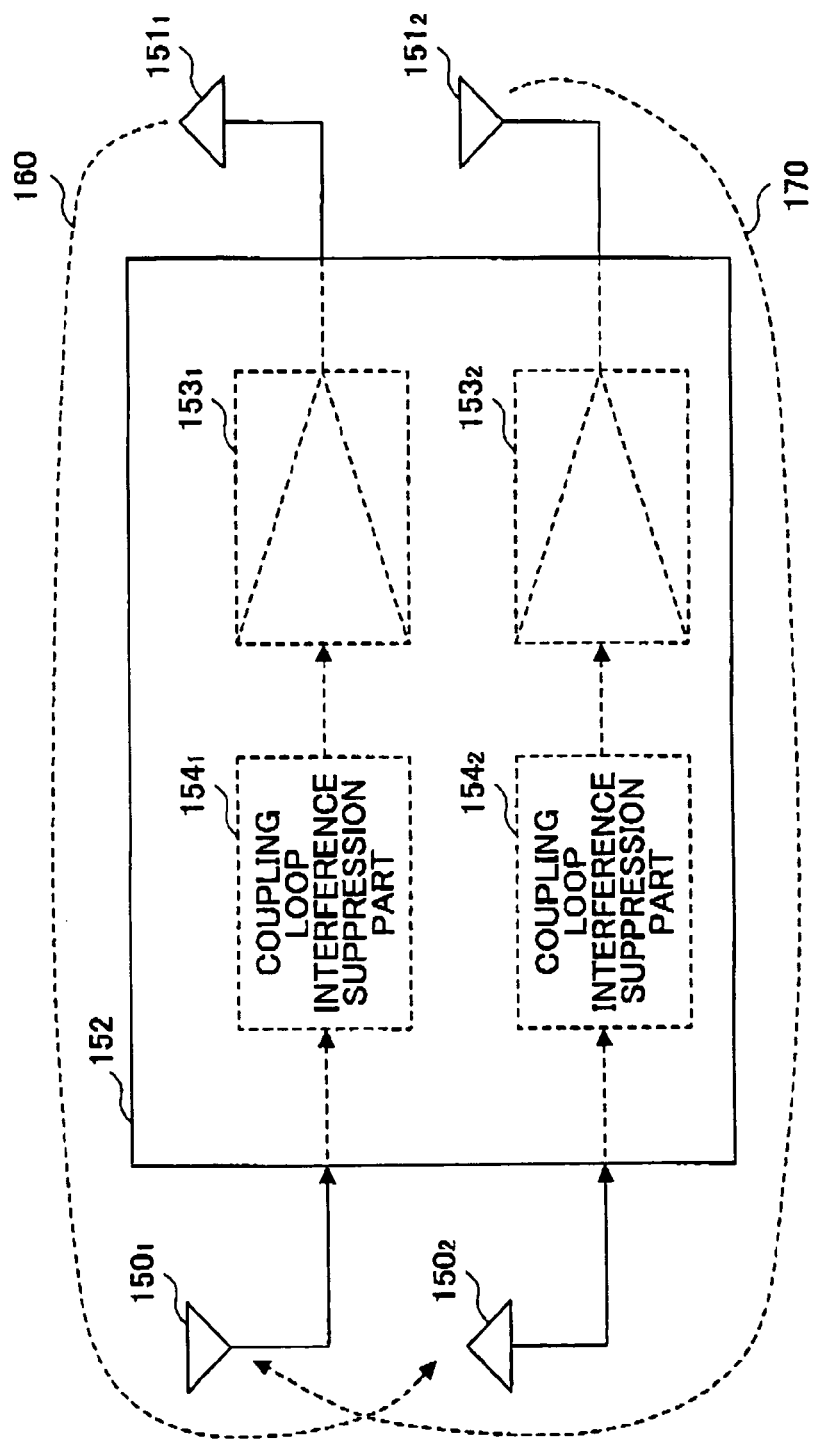
FIG. 13 is a drawing showing an exemplary configuration of a wireless relay apparatus used in an MIMO channel configuration.

FIG. 13 is a drawing showing an exemplary configuration of a wireless relay apparatus used for the above-described MIMO channel configuration. The wireless relay apparatus according to the sixth embodiment of the present invention may include a different polarization plane wave relay function.

The wireless relay apparatus shown in FIG. 13 includes: U number (U being an integer which is not less than 1) of first polarization reception antennas; V number (V being an integer which is not less than 1) of second polarization reception antennas having an orthogonal polarization characteristic to that of the first reception reception antenna; U second polarization transmission antennas having an orthogonal polarization characteristic to that of the first polarization reception antenna; and V first polarization transmission apparatuses having a polarization characteristic orthogonalized to that of the second polarization reception antenna.

The example shown in FIG. 13 is a case where U=V=1. In FIG. 13, the two antennas having polarization characteristics orthogonalized to each other are shown in a manner where one is illustrated as a triangle having its apex facing downward (inverted triangle) and the other is illustrated as a triangle having its apex facing upward.

The wireless relay apparatus in FIG. 13 includes a first polarization reception antenna $150_1$ and a second polarization reception antenna $150_2$. The radio signals received in the first and second polarization reception antennas $150_1$ and $150_2$ are suppressed in coupling loop interference suppression parts $154_1$ and $154_2$, and are supplied to amplifiers $153_1$ and $153_2$. The radio signals amplified by amplifiers $153_1$ and $153_2$ are transmitted from the first and second polarization transmission antennas $151_1$ and $151_2$.

In a case where the present invention is applied to the wireless relay apparatus including a different polarization plane wave relay function, the coupling loop interference suppression parts $154_1$ and $154_2$ may have a configuration similar to the configuration of the wireless relay apparatus shown in FIG. 2 (however, excluding the amplifier 19). Accordingly, in a case of executing relay with the same frequency, oscillation due to coupling loop interference can be prevented with more accuracy and multiple radio signals with the same frequency with orthogonalized polarization can simultaneously be relayed and amplified with a relatively high gain.

Figure 14:
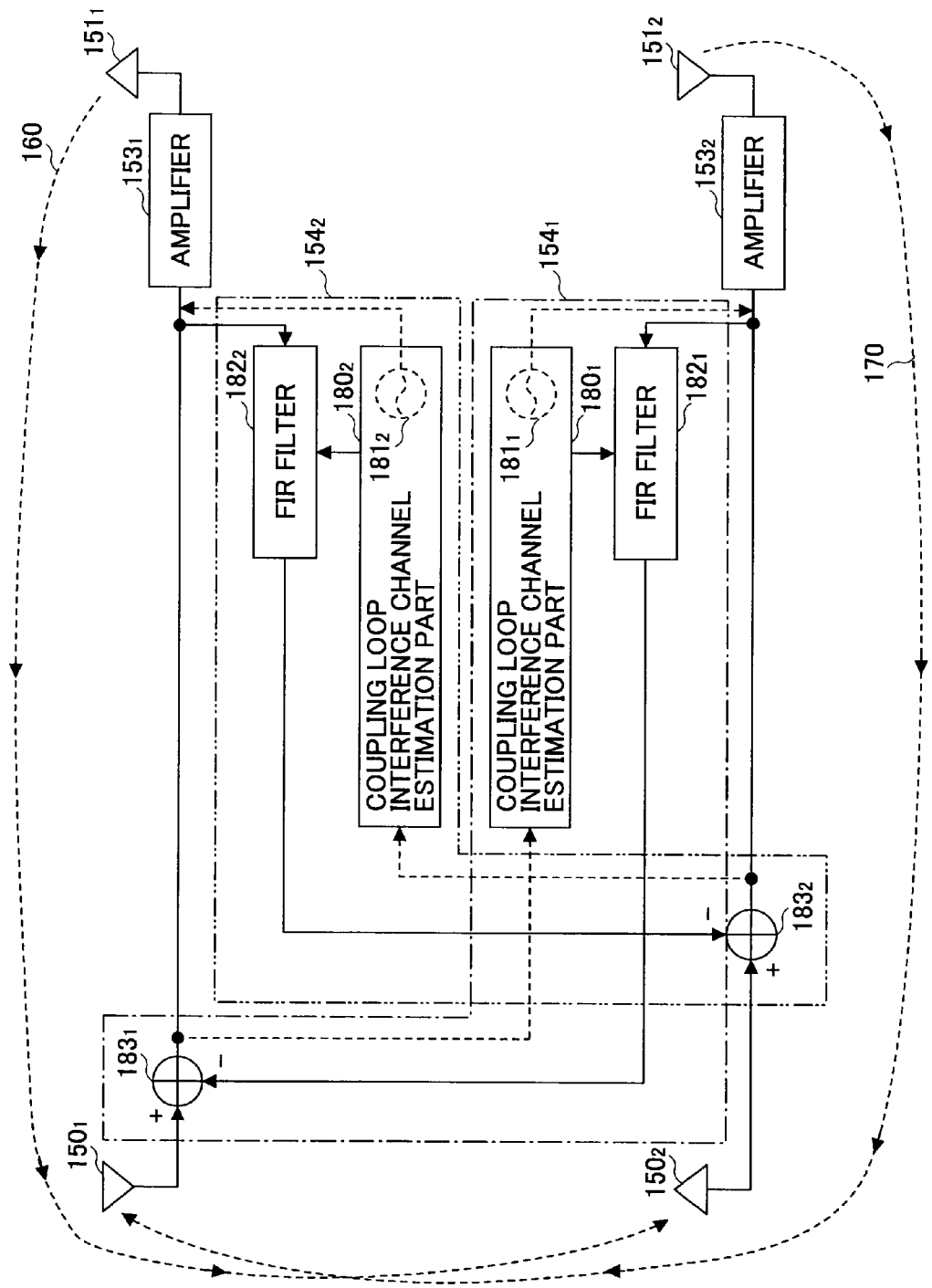
FIG. 14 is a drawing showing an exemplary configuration of a coupling loop interference suppression part of the wireless relay apparatus shown in FIG. 13.
Figure 15:
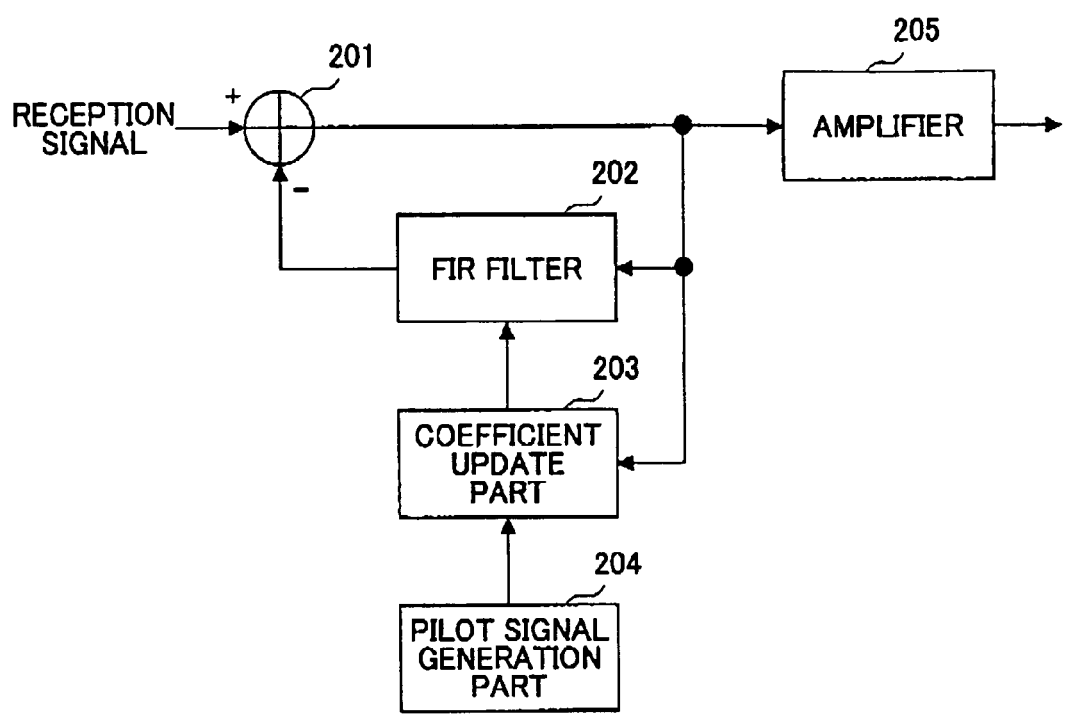
FIG. 15 is a drawing showing an exemplary configuration of a conventional wireless relay apparatus.

FIG. 14 is another embodiment where MIMO channel signal transmission is applied to the wireless relay apparatus of the present invention.

In this embodiment, when the reception radio signal of the second polarization reception antenna $150_2$ is transmitted from the first polarization transmission apparatus $151_2$ and is received at the first polarization reception antenna $150_1$ as a coupling loop interference signal, the coupling loop interference signal is suppressed. That is, when a coupling loop signal enters the closed loop, the coupling loop signal is suppressed before passing through the amplifier. Accordingly, the transmission channel characteristic (also referred to as impulse response, channel characteristic) of a coupling loop interference transmission channel 170, through which the coupling loop interference signal is transmitted from the first polarization transmission antenna $151_2$ to the first polarization reception antenna $150_1$, is estimated by a coupling loop interference channel estimation part $180_1$.

The characteristic of the coupling loop interference transmission channel 170, which is estimated by the coupling loop interference channel estimation part $180_1$, is convoluted in an FIR filter $182_1$ with respect to the signal received in the second polarization reception antenna $150_2$ (in this example, the signal input to the amplifier $153_2$), to thereby generate a replica of the coupling loop interference signal of the coupling loop interference transmission channel 170. The replica of the coupling loop interference signal is subtracted from the reception radio signal of the first polarization reception antenna $150_1$ by a subtractor part $183_1$. The signal output from the subtractor part $183_1$ is input to the amplifier $153_1$.

Accordingly, from the reception radio signal of the first polarization reception antenna $150_1$, the reception radio signal of the second polarization reception antenna $150_2$, which is transmitted to first polarization reception antenna $150_1$ via the coupling loop interference transmission channel 170 as the coupling loop interference signal, is suppressed by the coupling loop interference signal replica from the FIR filter $182_1$. That is, coupling loop interference signal is suppressed before the reception radio signal of the second polarization reception antenna $150_2$ is input to the closed loop, thereby preventing the coupling loop interference signal from being amplified by the amplifier and noise from being created.

Accordingly, by applying the present invention to a system executing MIMO channel signal transmission, oscillation due to coupling loop interference waves can be prevented with high accuracy and channel capacity between the transmission apparatus and the reception apparatus can be increased with the MIMO channel configuration.

Further, the present invention is not limited to these embodiments, but variations and modifications may be made without departing from the scope of the present invention.

The present application is based on Japanese Priority Application No. 2004-0427 filed on Feb. 19, 2004, with the Japanese Patent Office, the entire contents of which are hereby incorporated by reference.

What is claimed is:

1. A wireless relay system for relaying a radio signal transmitted from a first wireless station to a second wireless station via a wireless relay apparatus, the wireless relay system comprising:

a relay control part for receiving transmission symbols transmitted from the first wireless station and refraining from relaying a portion of the transmission symbols;

a pilot signal transmission part for transmitting a pilot signal that is inserted into a section of the portion of the transmission symbols such that the wireless relay system relays signals without interruption;

a coupling loop interference wave estimation part for receiving the pilot signal and estimating a coupling loop interference wave based on the pilot signal during a time when the pilot signal is being transmitted; and a coupling loop interference wave cancellation part for subtracting the estimated coupling loop interference wave from a reception signal, wherein the first wireless station is configured to insert the portion of the transmission symbols to be refrained from relay according to a desired accuracy for estimating a coupling loop interference wave, and an accuracy of the coupling loop interference wave estimated by the coupling loop interference wave estimation part increases as the portion of the transmission symbols to be refrained from relay increases.

2. The wireless relay system as claimed in claim 1, wherein the first wireless station includes a control signal transmission part for transmitting a control signal that is included in the transmission symbols transmitted to the wireless relay apparatus, wherein the wireless relay apparatus includes a relay refrain control part for refraining from relaying the radio signals in a section of the control signal.

3. The wireless relay system as claimed in claim 2, wherein the control signal transmission part includes a frame generation part for generating a frame of the transmission symbols with a null symbol inserted therein, wherein the relay refraining control part includes a relay refraining part for refraining relay of signals in a section where the null symbol is inserted.

4. The wireless relay system as claimed in claim 1, wherein the wireless relay apparatus includes a delay part for delaying the relay of the transmission symbols to an extent of N symbols, wherein N represents an integer which is not less than 1.

5. The wireless relay system as claimed in claim 1, wherein in a case of relaying a signal by using an OFDM transmission method, the wireless relay apparatus includes an IFFT part for performing an IFFT process to generate the transmission signal, and an FFT part for performing an FFT process on the reception signal, and the first wireless station includes an OFDM frame generation part for inserting a null signal into a portion of a time/frequency domain and generating a frame that is to be transmitted to the wireless relay apparatus.

6. The wireless relay system as claimed in claim 5, wherein the OFDM frame generation part calculates a sub-carrier interval for inserting the null signal in accordance with a formula of ceil {(FFT point value)/(GI point value)}, wherein "ceil (x)" represents a numeric function that returns a least integer greater than x, "FFT" represents Fast Fourier Transform and "GI" represents guard interval.

7. The wireless relay system as claimed in claim 5, wherein the wireless relay apparatus includes a channel estimation part for receiving the pilot signal and estimating a channel in accordance with the received pilot signal, and a signal amplitude control part for controlling an amplitude of the reception signal based on a result of the channel estimation by the channel estimation part.

8. The wireless relay system as claimed in claim 7, wherein the signal amplitude control part employs a water filling theorem for controlling the amplitude of the reception signal.

9. The wireless relay system as claimed in claim 1, wherein the first wireless station, the second wireless station, and the wireless relay apparatus each includes a plurality of antennas, wherein the antennas are used to form a MIMO channel, wherein the relay control part, a pilot signal transmission part, the coupling loop interference wave estimation part, and the coupling loop interference wave cancellation part are employed when executing transmission of MIMO channel signals.

10. A wireless relay apparatus for relaying a radio signal transmitted from a first wireless station to a second wireless station, the wireless relay apparatus comprising:

a relay control part for receiving transmission symbols transmitted from the first wireless station and refraining from relaying a portion of the transmission symbols;

a pilot signal transmission part for transmitting a pilot signal that is inserted into a section of the portion of the transmission symbols such that the wireless relay apparatus relays signals without interruption;

a coupling loop interference wave estimation part for receiving the pilot signal and estimating a channel impulse response of coupling loop interference wave based on the pilot signal during a time when the pilot signal is being transmitted; and a coupling loop interference wave cancellation part for subtracting the estimated coupling loop interference wave from a reception signal, wherein the portion of the transmission symbols to be refrained from relay is inserted by the first wireless station according to a desired accuracy for estimating a coupling loop interference wave, and an accuracy of the coupling loop interference wave estimated by the coupling loop interference wave estimation part increases as the portion of the transmission symbols refrained to be from relay increases.

11. A wireless relay method for relaying a radio signal transmitted from a first wireless station to a second wireless station, the wireless relay method comprising the steps of:

a) receiving transmission symbols transmitted from the first wireless station;

b) refraining from relaying a portion of the transmission symbols inserted by the first wireless station according to a desired accuracy for estimating a coupling loop interference wave;

c) transmitting a pilot signal that is inserted into a section of the portion of the transmission symbols such that either the pilot signal or the transmission symbols are transmitted without interruption;

d) receiving the pilot signal;

e) estimating a coupling loop interference wave based on the pilot signal during a time when the pilot signal is being transmitted, wherein an accuracy of the coupling loop interference wave estimated in step e) increases as the portion of the transmission symbols to be refrained from relay increases; and f) subtracting the estimated coupling loop interference wave from a reception signal.

* * * * *